(12) United States Patent
Armbruster

(10) Patent No.: US 9,168,687 B2
(45) Date of Patent: Oct. 27, 2015

(54) ROTATION DEVICE FOR AN INJECTION-MOLDING DEVICE

(75) Inventor: Rainer Armbruster, Wolfach (DE)

(73) Assignee: Foboha GmbH, Haslach (DE)

( * ) Notice: Subject to any disclaimer, the term of this patent is extended or adjusted under 35 U.S.C. 154(b) by 0 days.

(21) Appl. No.: 14/130,046

(22) PCT Filed: Jun. 28, 2012

(86) PCT No.: PCT/EP2012/062602
§ 371 (c)(1),
(2), (4) Date: Apr. 10, 2014

(87) PCT Pub. No.: WO2013/001022
PCT Pub. Date: Jan. 3, 2013

(65) Prior Publication Data
US 2014/0308388 A1 Oct. 16, 2014

(30) Foreign Application Priority Data
Jun. 29, 2011 (CH) ........................................ 1095/11

(51) Int. Cl.
*B29C 45/16* (2006.01)
*B29C 45/04* (2006.01)
(52) U.S. Cl.
CPC ........... *B29C 45/0441* (2013.01); *B29C 45/045* (2013.01); *B29C 45/1628* (2013.01)
(58) Field of Classification Search
CPC .................................................. B29C 45/045
USPC ................................ 425/10, 131.1, 574, 576
See application file for complete search history.

(56) References Cited

U.S. PATENT DOCUMENTS

| | | | |
|---|---|---|---|
| 3,319,300 A | 5/1967 | Hehl | |
| 4,933,122 A * | 6/1990 | Suzuki et al. | 264/13 |
| 5,328,351 A | 7/1994 | Schönebeck | |
| 6,132,201 A | 10/2000 | Looije et al. | |
| 6,613,262 B1 | 9/2003 | Arend | |
| 7,661,945 B2 * | 2/2010 | Lipson | 425/131.1 |
| 7,922,477 B2 | 4/2011 | Danel | |
| 2007/0065536 A1 | 3/2007 | Chen | |
| 2008/0199555 A1 | 8/2008 | Danel | |

FOREIGN PATENT DOCUMENTS

| | | |
|---|---|---|
| DE | 20 2004 020 290 U1 | 9/2005 |
| EP | 0 511 564 A1 | 11/1992 |
| EP | 1 277 557 A1 | 1/2003 |
| JP | 2007-152820 | 6/2007 |
| WO | WO 99/28108 | 6/1999 |
| WO | WO 2005/035218 A1 | 4/2005 |
| WO | WO 2008/043641 A1 | 4/2008 |
| WO | WO 2011/107395 A1 | 9/2011 |

OTHER PUBLICATIONS

L. Sors, "Spritzgeiβwerkzeuge Für Zweifarbige Kunststoffteile", Kunststoffe, Jul. 1979, v. 69 No. 7, pp. 383-384, Munich, Germany.

* cited by examiner

*Primary Examiner* — Tim Heitbrink
(74) *Attorney, Agent, or Firm* — Pauley Erickson & Kottis

(57) ABSTRACT

The invention relates to a rotation device (1) for rotating the center part (2) in an injection-molding device. The rotation device comprises a column (3) which is non-rotatably mounted in the interior of the center part (2) and a sleeve (4) surrounding the same which is mounted such as to rotate with the center part (2), said sleeve (4) and said column (3) being operatively interconnected via a drive.

15 Claims, 5 Drawing Sheets

ROTATION DEVICE FOR AN INJECTION-MOLDING DEVICE

BACKGROUND OF THE INVENTION

1. Field of the Invention

The present invention lies within the realm of devices for the injection molding of materials, in particular plastic parts. The invention lies particularly with the realm of injection-molding devices having a rotation device for rotating one or more center blocks in an injection-molding device according to the pre-characterizing clause of the independent patent claim.

2. Discussion of Related Art

Injection-molding devices for injection molding having one or more rotating center parts which are rotated by 90° or 180° about an axis are known from the prior art. These are used, for example, for the efficient production of multi-component plastic parts. At least one rotatable center part (center block) is provided between two clamping plates for first and second mold halves which can be moved along tie bars in opposite directions. The center block is preferably movably mounted on the tie bars and/or with respect to a machine bed by means of a holding device, and is arranged so that it can be rotated about an axis of rotation by means of a rotation device. The rotatable center block has at least two side surfaces for accommodating third mold halves, which act together with the first and the second mold halves to form cavities. In certain embodiments, the rotatable center block can act together, at least on one side, with a further rotatable center part.

In order to guarantee operation, it is usually necessary for the rotatable center part to be continuously supplied with one or more media while the device is being operated. These can include water, air, oil and electrical power or data, e.g. in the form of measured values. One problem is that one or more media have to be transferred from the stationary holder to the rotatable center part. With the devices disclosed in the prior art, liquid or gaseous media are transferred by means of annular grooves which are arranged parallel and adjacent to one another on a shaft and/or in a correspondingly formed bore, and which are separated from one another by seals. In total, more than 20 circuits can be necessary in order to ensure an adequate supply of media.

One problem with the transfer devices disclosed in the prior art is that they are comparatively large and have a complex structure. Frequently, transfer devices, which project significantly over the rotatable center part and therefore take up a large amount of space, are arranged below and above the center part.

WO9928108 by the same applicant is concerned with a holding device for a rotatable center part. The holding device has two cross members which are supported on tie bars and each carry a rotation unit. A rotatable center part can be clamped between the rotation units. Media are transferred via the axis of rotation of at least one rotation unit which is arranged outside the rotatable center part.

WO08043641 A1 (U.S. Pat. No. 7,922,477) has been filed in the name of the company Sidel and describes a form of rotation device for a horizontal injection-molding machine. The rotation device comprises a base plate, on which is mounted a rotary table which can be rotated about a vertical axis, and drive means for rotating the rotary table. The rotation unit has a plurality of media lines which are arranged in the interior of the axis. An object is to reduce the size and volume of the rotation device.

U.S. Pat. No. 6,132,201 has been filed in the name of the company Husky and describes an injection-molding machine. A center part is rotatably arranged about a horizontal axis. In FIG. 2, a rotatable multiple distributor is arranged at the side next to and outside the rotatable center part in the manner disclosed in the prior art.

EP0511564 has been filed in the name of the company Krupp Corpoplast and is concerned with a device for blow molding plastic. The device for blow molding a thermoplastic has a heating device for temperature-control of parisons and a blowing device for blow molding the parisons. A cam disc has grooves which are arranged substantially concentrically with respect to a center line. The grooves are used to feed in and also to discharge pressure.

WO2005035218 has been filed in the name of the company Krauss-Maffei Kunststofftechnik AG and is concerned with a horizontal injection-molding machine with rotation device. The rotation device is mounted on a machine bed between the tie bars of an injection-molding machine. The rotation device is arranged in a stationary manner. Although the media feed to the rotatable center part is mentioned on Page 3, the person skilled in the art cannot derive any further relevant details with regard thereto.

SUMMARY OF THE INVENTION

An object of the invention is to show an improved rotation device for rotatable mold center blocks which have a space-saving design and can be produced in a simplified, more cost-effective manner.

This object is achieved by the rotation device defined in the independent patent claims. Advantageous embodiments and various alternatives can be seen from the dependent claims.

An embodiment of the rotation device according to the invention for rotating a center part in an injection-molding device has a column which, as a rule, is non-rotatably mounted in the interior of the center part and is surrounded by a sleeve which rotates with the center part. The sleeve and the column are operatively connected by means of a drive, by means of which the center part can be rotated with respect to the column. The sleeve can be permanently incorporated into the rotating center part. Grooves, which are used to exchange liquid and/or gaseous media between the column and the center part, can be arranged between the column and the sleeve. Further grooves can be provided to accommodate sealing rings. The column can have first channels which run in the longitudinal direction of the column and are operatively connected to the grooves and are used for transporting media. The sleeve can have second channels which, for example, are connected to actuators and/or cooling circuits. Advantageously, the drive is arranged in the region of an upper and/or a lower column end. More than one drive can be provided if required. For example, the center part can be divided in the vertical direction so that although the two parts are mounted on the same column, they can be rotated independently of one another. The drive usually comprises a motor and a gearbox. Advantageously, the gearbox is designed as a planetary gearbox which distributes the drive torque via a plurality of planet gears. The wear on the gears and the loading on the bearings are reduced, particularly when the center part is moved in steps. The planetary gearbox also makes it easy to adjust the transmission ratio. Alternatively or in addition, other drives, e.g. with a toothed belt, etc, can be provided. Electric and/or hydraulic motors are normally used as the drive means.

In an embodiment, the column ends at the bottom end in a base which is rigidly or movably mounted on a machine bed and/or on tie bars of an injection-molding machine. The column and/or the sleeve can be designed in several parts if required. Bearings are arranged between the column and the sleeve. The motor or motors responsible for the drive can be arranged below and/or above the column. Alternatively or in addition, a motor can be arranged so that it rotates with the center part. For example, it can be arranged in the interior of the center part. A rotation device according to the invention can be designed as part of an injection-molding machine. Alternatively or in addition, a rotation device can be integrated into an injection-molding tool which can be inserted into an injection-molding machine.

In an embodiment, the connection between the rotatable center part and the column and/or the column and its base and/or the base and the machine bed and/or the tie bars of an injection-molding machine can be easily released so that the rotation device and/or components thereof can be easily replaced.

An advantage of the invention is that, as a result of the column arranged in the interior, among other things, the rotating masses can be reduced, which has a positive effect on the manufacturing costs and the operation of the system due to the lower material consumption. A further advantage is that the device is significantly more compact, as parts necessary for the rotation and for the transfer of the media are relocated to the interior of the center part.

BRIEF DESCRIPTION OF THE DRAWINGS

Preferred embodiments of the invention are shown below based on the drawings, which serve merely to provide an explanation and are not to be construed in a restrictive manner. Features of the invention which become apparent from the drawings are to be considered individually and in every combination as being part of the disclosure of the invention. In the drawings.

DETAILED DESCRIPTION OF THE INVENTION

Figure 1:
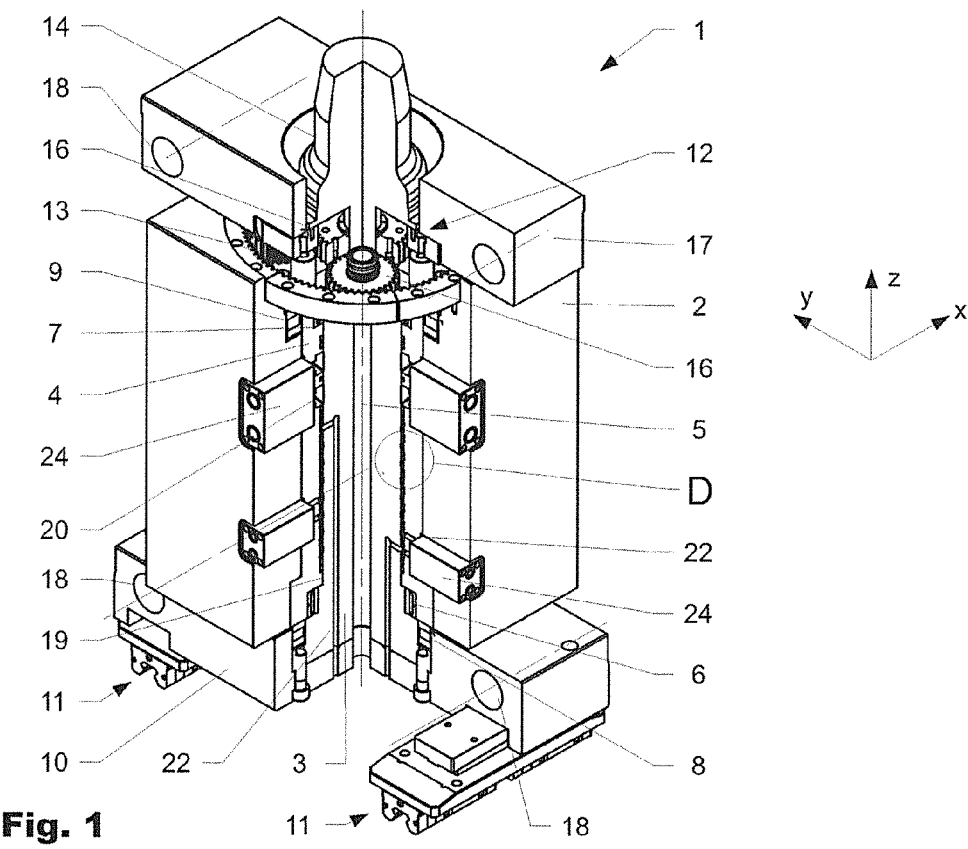
FIG. 1 shows a first embodiment of a rotation device with two-sided mounting from diagonally above.
Figure 2:
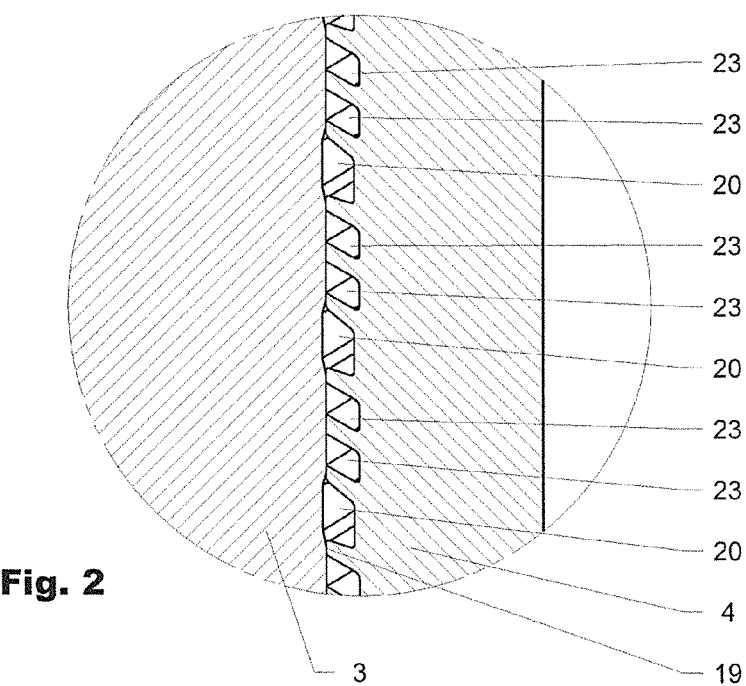
FIG. 2 shows detail D in an enlarged representation.
Figure 3:
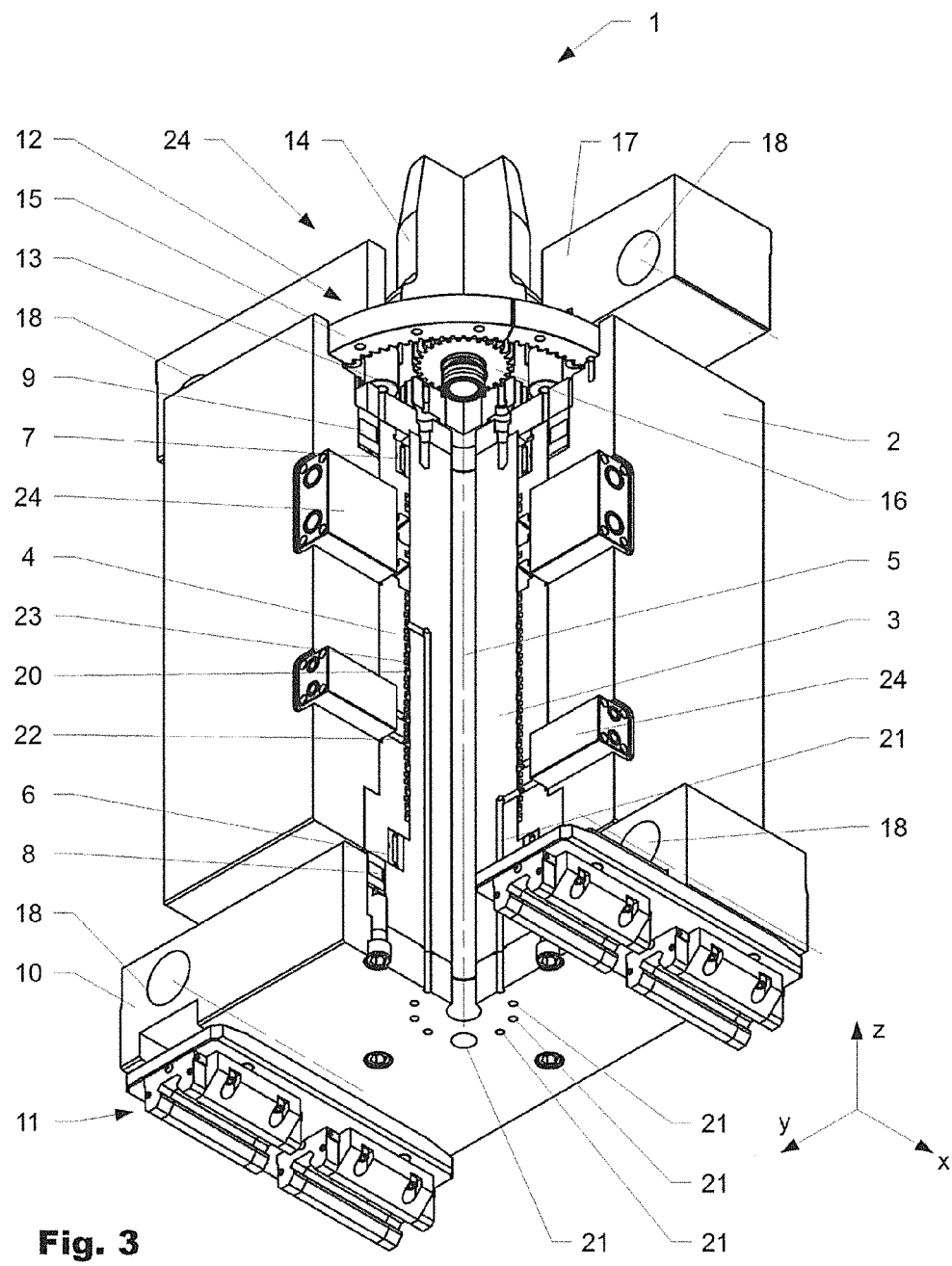
FIG. 3 shows the rotation device according to FIG. 1 from diagonally below.

FIG. 1 shows a first embodiment of a rotation device 1 according to the invention for a center part 2 of an injection-molding machine (not shown in detail). FIG. 3 shows the same rotation device 1 from diagonally below. In both figures, the rotation device 1 is shown partially in section so that the inner workings become visible. FIG. 2 shows detail D from FIG. 1 in an enlarged representation.

The rotation device 1 has a central column 3, about which the center part 2 is rotatably mounted. In the embodiment shown, the column 3 is surrounded by a sleeve 4, which is rotatably arranged about an axis of rotation 5 with respect to the column 3.

The sleeve 4 or the center part 2 respectively is operatively connected to the column 3 by means of a first and a second radial bearing 6, 7 and a first and a second axial bearing 8, 9, which absorb forces between stationary and moving parts.

On the underside, the column 3 merges into a base 10 which is mounted with respect to a machine bed and/or tie bars of an injection-molding machine (neither shown in detail). Generally, the base 10 is mounted in the longitudinal direction of the injection-molding machine by means of linear guides 11. Alternatively or in addition, the rotation device can be mounted on the bottom two tie bars of the injection-molding machine.

In the embodiment shown, a gearbox 12, by means of which the center part 2 can be driven with respect to the stationary column 3, is arranged at the top end of the column 3. Here, the gearbox 12 is designed as a planetary gearbox with an externally toothed sun gear 13, which is operatively connected to a motor 14, an internal ring gear 15, which is operatively connected to the rotatable center part 2, and planet gears 16 arranged between them. Together, the motor 14 and the gearbox 12 form a drive 24 of the center part 2. In the embodiment shown, the planet gears 16 are attached in a stationary manner with respect to the column 3. A rotation of the gear 13 is transferred by means of the plurality of planet gears 16 to the internal ring gear 15 and from here to the center part 2. An advantage is that, due to the plurality of planet gears 16, the drive torque is transferred from the sun gear 13 to the internal ring gear 15 in a distributed manner. Depending on the embodiment, the gearbox can also be located in a different position. For example, it is possible to arrange the motor below the column and to transmit the drive torque to the sun gear 13 by means of a shaft arranged in a bore of the column 3.

The motor 14 and the gearbox 12 are incorporated into an upper cross member 17 which, in the assembled state, is operatively connected to the tie bars of an injection-molding machine or other guide means. For this purpose, the upper cross member 17 has schematically shown linear bearings 18, which are intended as an operative connection to the tie bars of an injection-molding machine. Depending on the embodiment, the linear bearings 18 can also be designed to be open on one side. In the embodiment shown, the lower cross member 10 is also provided with linear bearings 18.

First grooves 20, which are connected to column-side first channels and sleeve-side second channels 22, 23 through which media can be fed to and/or discharged from the center part 2, are arranged on an inner wall 19 of the sleeve 4 for exchanging liquid and/or gaseous media between the rotating and non-rotating parts. This constitutes an advantage of the device. As can best be seen from the enlarged diagram according to FIG. 2, second annular circumferential grooves 23, which are used to accommodate sealing rings (not shown in more detail), are arranged between the first grooves 20. For better understanding, the section surfaces in FIG. 2 are shown hatched. The second channels 22 are operatively connected to actuators 24 or cooling circuits, for example, within the rotatable center part 2.

Figure 4:
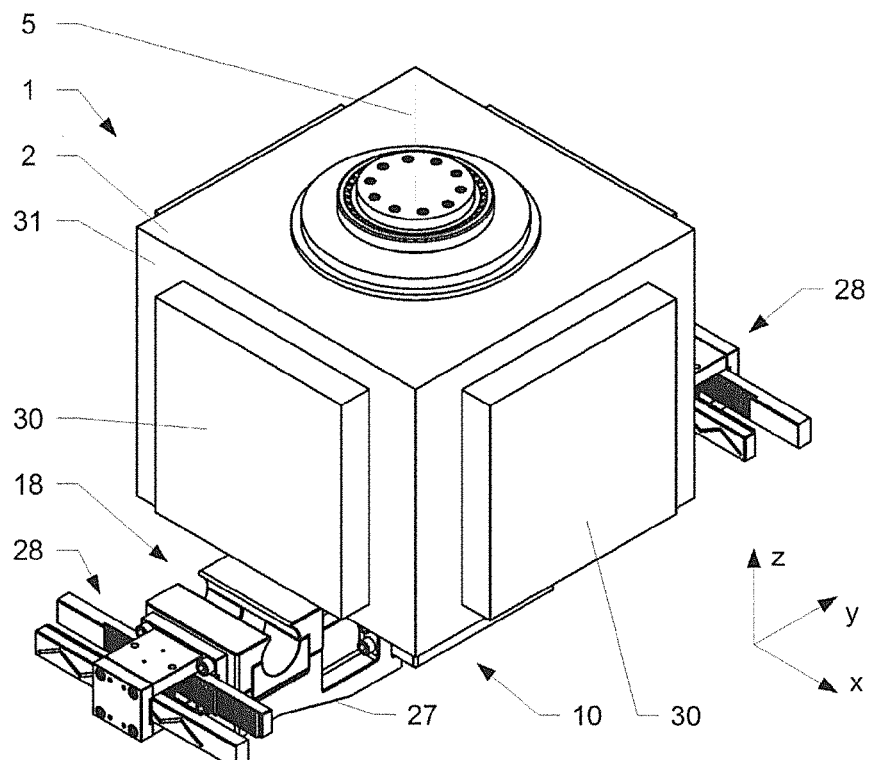
FIG. 4 shows a second embodiment of a rotation device from diagonally above.
Figure 5:
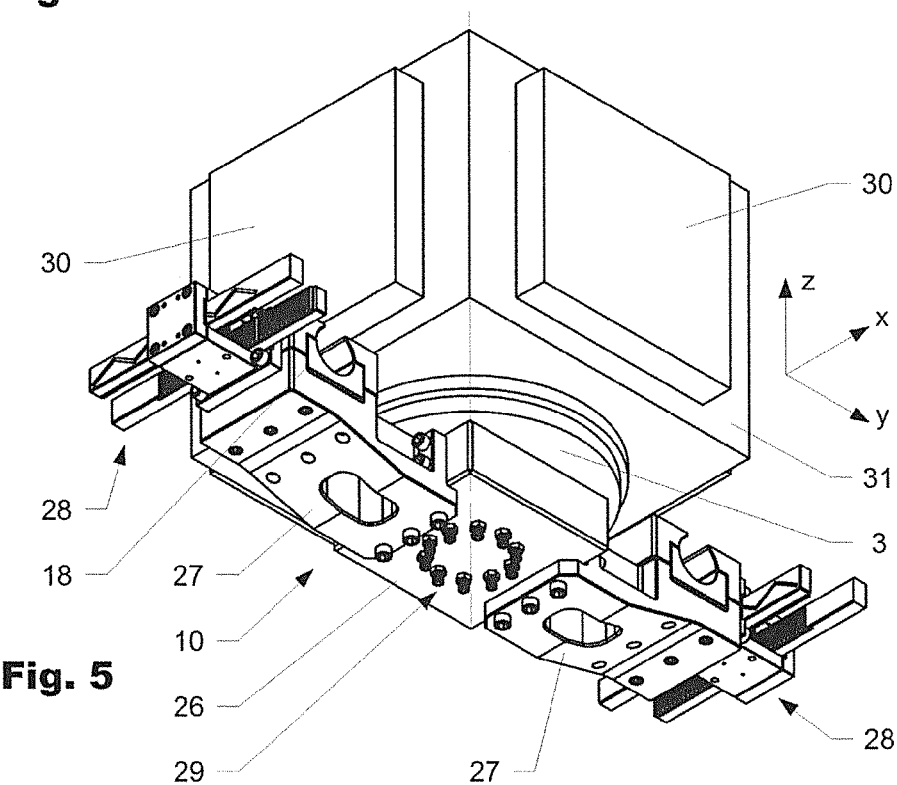
FIG. 5 shows the rotation device according to FIG. 4 from diagonally below.
Figure 6:
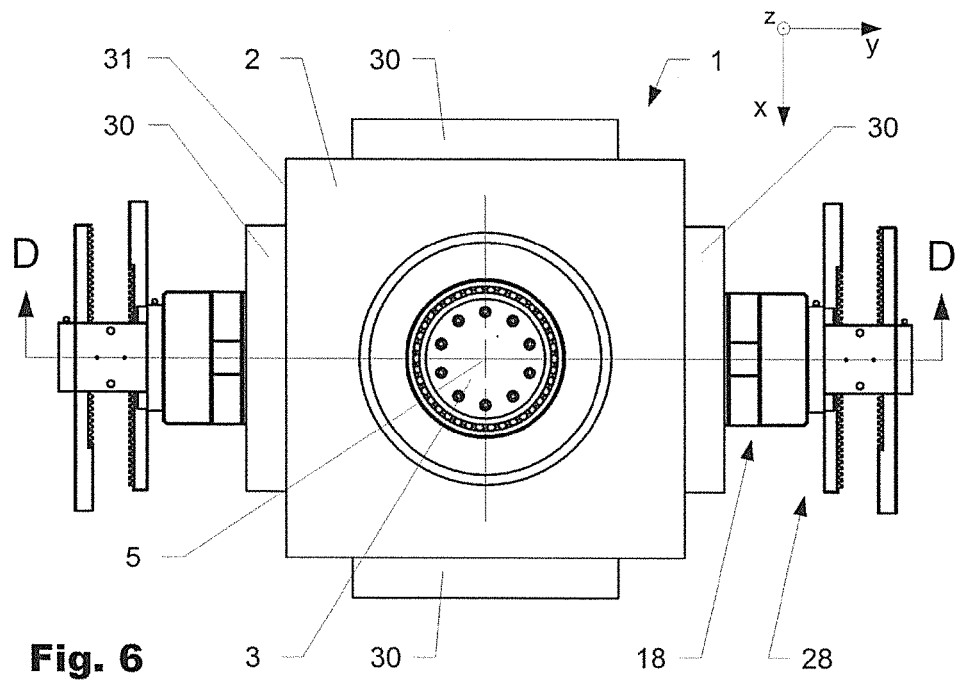
FIG. 6 shows the rotation device according to FIG. 4 in a plan view.
Figure 7:
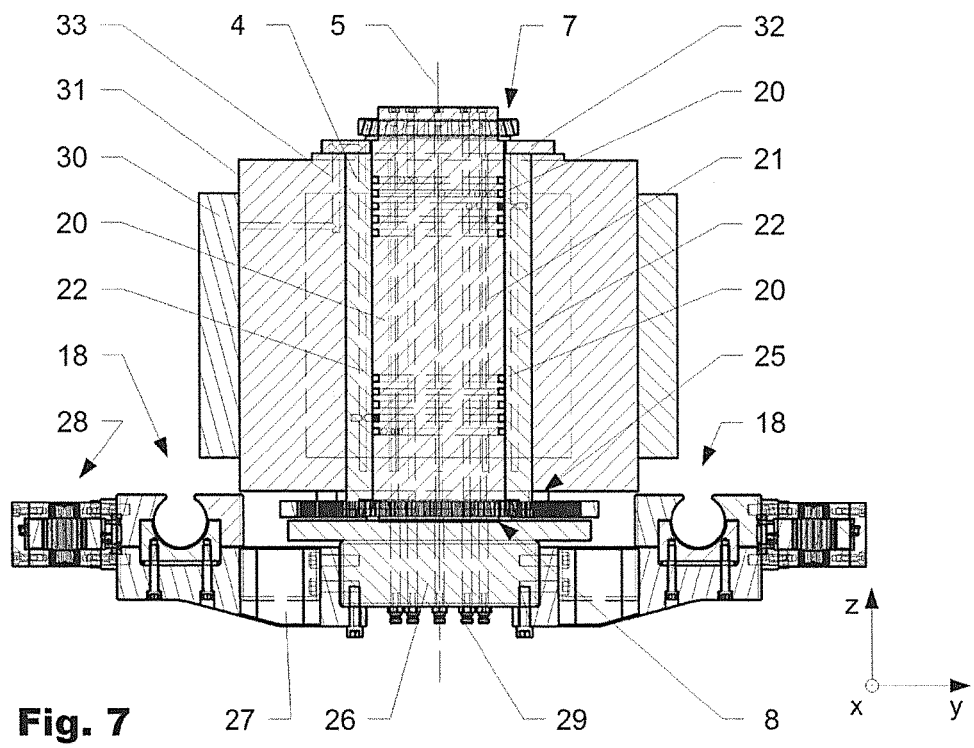
FIG. 7 shows the rotation device in a sectional view along the section line according to FIG. 6.

FIG. 4 shows a further embodiment of a rotation device 1 according to the invention in a view from diagonally above. FIG. 5 shows the same rotation device 1 from diagonally below and FIG. 6 from above. FIG. 7 shows the rotation device 1 in a sectional view along the section line DD according to FIG. 6. Reference is made to the previous figures for the basic description of the principle of operation. Identical parts are given the same references. In the embodiment shown, the rotation device 1 has no upper cross member but is designed to be freestanding.

As can be seen in FIG. 5, the base 10 has a modular design. The vertically running column 3 and two, in this case lateral, adapters 27 to which linear bearings 18 and two coordination means 28 are fixed, are fixed to a based body 26. The rotation device 1 can be matched to different injection-molding machines by means of differently designed adapters. If required, the adapters 27 can also be designed such that the rotation device can be supported on a machine bed of an injection-molding machine. In the embodiment shown, the coordination means 28 are based on toothed racks and cause the rotation device 1 to take up a defined position between the two mold clamping plates of the injection-molding machine when the injection-molding machine is opened and closed.

Connections 29 for media lines can be seen on the underside of the base body 26. The connections 29 are operatively connected to the first channels 21 in the interior of the column 3. In the embodiment shown, the center part 2 carries mold halves 30 which are fixed to external surfaces 31 of the center part.

As can be seen in the sectional view according to FIG. 7, in this embodiment, the drive 25 is located in the region of the bottom end of the column 3 between the base 10 and the center part 2. Here, the first grooves 20 are arranged on the column side. Second channels 22, which run vertically into the sleeve 4 and are operatively connected to the first grooves 20, can be seen on the sleeve side. Media are exchanged with the second channels 22 by means of the first channels 21 and the first grooves 20. The second channels 22 are in turn operatively connected to further, third channels 33 in the center part 2. In an embodiment, the operative connection is made via the end of the sleeve 4 by means of one or more transfer plates 32 or other means. Alternatively or in addition, the channels can also be arranged to run radially.

Figure 8:
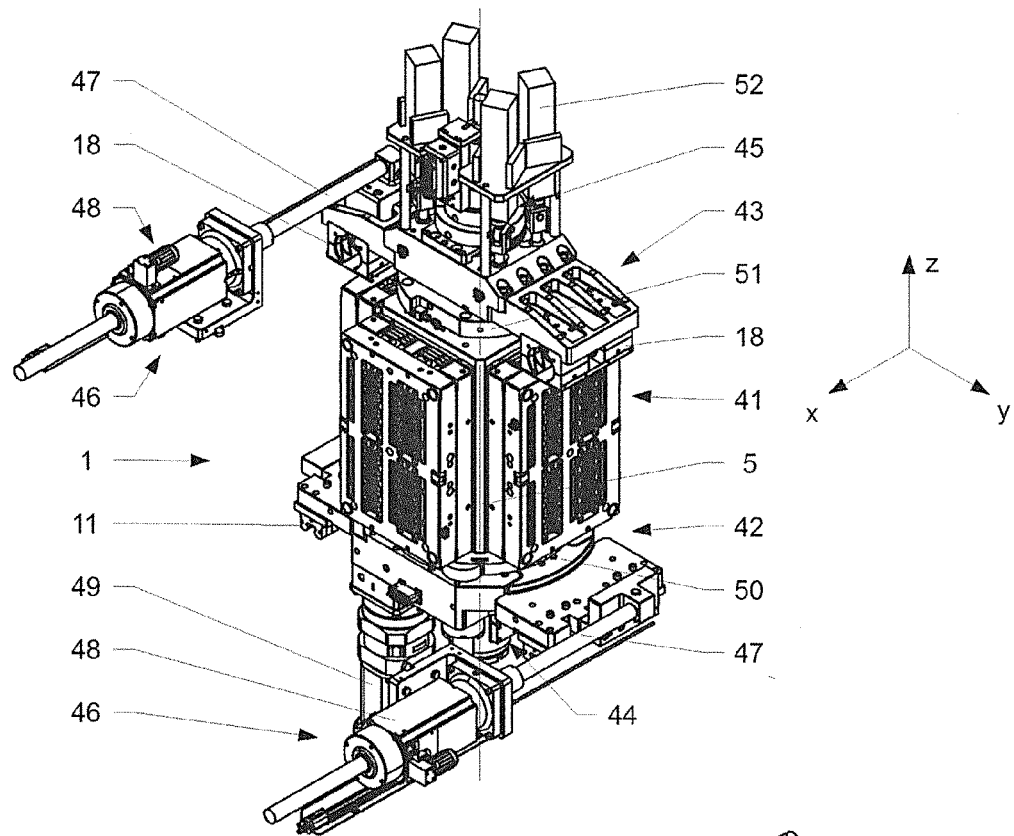
FIG. 8 shows an embodiment of a holding device for a center block from diagonally above.
Figure 9:
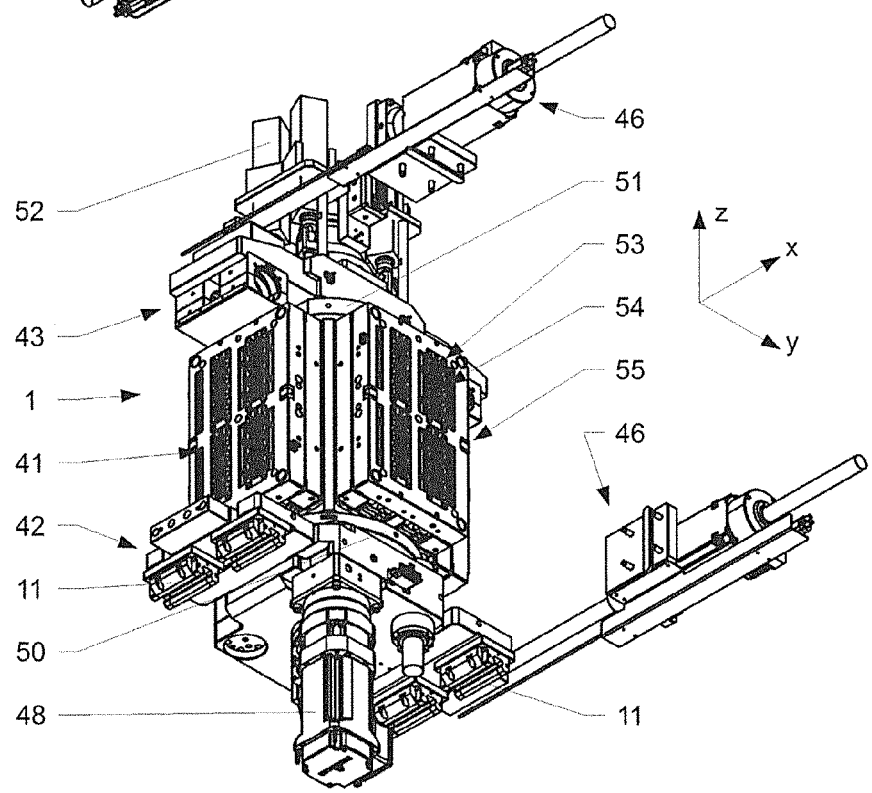
FIG. 9 shows the holding device according to FIG. 8 from diagonally below.

FIG. 8 shows a rotation device 1 with a holding device 40 for a center block 41 from diagonally above. FIG. 9 shows the same rotation device 1 with the holding device 40 and the same center block 41 from diagonally below. The holding device 40 comprises a lower and an upper cross member 42, 43, each having a rotation unit 44, 45, which serve to hold the center block 41. At the same time, the center block 41 is arranged so that it can be rotated about an axis of rotation 5. Here, the cross members 42, 43 have a modular structure which is described in international patent application WO2011/107395 by the same applicant, and reference is therefore made to this protective right in this regard. In order to move the rotation device 1 in the longitudinal direction (x-direction), the lower cross member 42 has linear guides 11 which are supported on a machine bed of an injection-molding machine.

Other arrangements are possible. The upper cross member 43 has linear bearings 18, by means of which the upper cross member 43 is mounted along tie bars, e.g. of an injection-molding machine (neither of which is shown).

The cross members 42, 43 are driven linearly in the longitudinal direction (direction of the tie bars of the injection-molding machine, or x-direction) by means of two electrical spindle drives 46, which are arranged diagonally with respect to one another and which, in the embodiment shown, are arranged diagonally with respect to one another. If the center block is only held by means of one cross member, e.g. as shown in the embodiments according to FIGS. 1-7, the spindle drives 46 can also be mounted on the left and right on the one cross member or, if required, in the case of very small and inexpensive devices, also on only one side. In the case of larger tools, spindle drives 46 can also be arranged at all corners.

The spindle drives 46 each have a spindle 47, each of which is non-rotatably operatively connected to a cross member 42, 43. The spindles 47 pass through spindle nuts (not shown in more detail) which are operatively connected to one of these drive motors 48. If required, a gearbox can be connected between them. In turn, the motors 48 are operatively connected to a stationary or a moving mold clamping plate and/or a mold half (neither of which is shown in more detail). The linear drives 46 serve to move the operatively connected cross member 42, 43 relative to a mold clamping plate in the longitudinal direction (x-direction) via the spindles 47.

A rotary drive 49 serves to rotate the center block 41 about the axis of rotation 5. In the embodiment shown, the rotary drive 49 is an electric motor. Hydraulic drives are possible. In the embodiment shown, the rotary drive is fixed to the lower cross member 42 and is operatively connected to a lower rotary table 50 by means of a gear connection. If required, a reduction gearbox can be connected between them. Likewise, it is possible The center block 41 is held at the bottom by the lower rotary table 50 and at the top by the upper rotary table 51. As a rule, the rotary tables 50, 51 are releasably operatively connected to the center block 41 in the vertical direction (z-direction). Here, four vertically arranged electrical adjustment drives 52, which serve to drive the ejector pins 53 in the region of cavities 54 on side surfaces 55 of the center block 41 from above by means of a mechanical operative connection, can be seen on the upper cross member 43. The mechanical operative connection is designed so that the ejector pins can spring into action at least in two or four positions. In doing so, they press from above on the mechanical operative connection in the center block, which in turn acts on the ejector pins 53 so that they are moved forwards out of the cavities, thus effecting the ejection of the manufactured parts or contributing thereto.

An advantage of the arrangement shown is that exclusively electrical drives, which work very precisely and quickly, can be used for the linear movement in the longitudinal direction or the rotation of the center block 41 about the axis of rotation 5, and for ejecting the manufactured parts (not shown). A further advantage is that the risk of leakage of hydraulic oil is reduced. A further advantage of the embodiment shown is that fewer hydraulic hoses are provided. A further advantage is that this technology is suitable for use in clean rooms.

The drive concept shown in FIGS. 8 and 9 is suitable for use with the embodiments according to FIGS. 1 to 7. For example, electrical spindle drives are operatively connected to one or more cross members 10, 17 on one or two sides. In this case, the center block 2 is driven by an electric motor which is fixed on one of the cross members or on the center block, and is supported with respect to the column 3 at least with regard to its torque.

The invention claimed is:
1. A rotation device (1) for rotating a center part (2) in an injection-molding device comprising:
 a column (3) non-rotatably mounted in an interior of the center part (2) and a sleeve (4) surrounding the column (3), the sleeve (4) which rotates with the center part, the sleeve (4) and the column (3) operatively connected via a drive (12, 14),
 wherein grooves (22, 23), used to exchange liquid and/or gaseous media between the column (3) and the center part (2), are arranged between the column (3) and the sleeve (4).

2. The rotation device (1) as claimed in claim 1, wherein the column (3) includes first channels (21) which run in the longitudinal direction (z) and are operatively connected to the grooves (22, 23).

3. The rotation device (1) as claimed in claim 1, wherein the sleeve includes second channels (22) which are connected to actuators and/or cooling circuits.

4. The rotation device (1) as claimed in claim 1, wherein the drive (12, 14) is arranged in a region of an upper and/or lower column end.

5. The rotation device (1) as claimed in claim 1, wherein the drive comprises a motor (14) and a gearbox (12).

6. The rotation device (1) as claimed in claim 5, wherein the gearbox (12) is a planetary gearbox.

7. The rotation device (1) as claimed in claim 1, wherein the column (3) ends at a bottom end in a base (10) which is mounted on a machine bed and/or on tie bars of an injection-molding machine.

8. The rotation device (1) as claimed in claim 1, wherein the column (3) and/or the sleeve (4) are designed in several parts.

9. The rotation device (1) as claimed in claim 1, wherein bearings (6, 7) are arranged between the column (3) and the sleeve (4).

10. The rotation device (1) as claimed in claim 1, wherein a motor (14) is arranged below and/or above the column (3).

11. The rotation device (1) as claimed in claim 1, wherein a motor (14) is arranged to rotate with the center part (2).

12. The rotation device as claimed in claim 11, wherein the motor (14) is arranged in the interior of the center part (2).

13. The rotation device (1) as claimed in claim 1, wherein the motor (14) is comprises a hydraulic or an electric motor.

14. An injection-molding machine having a rotation device (1) as claimed in claim 1.

15. An injection-molding tool having a rotation device (1) as claimed in claim 1.

* * * * *